(12) United States Patent
Zancola et al.

(10) Patent No.: US 7,504,939 B2
(45) Date of Patent: Mar. 17, 2009

(54) SYSTEM AND METHOD FOR LOCATING A WIRELESS DEVICE

(75) Inventors: Ronald Zancola, Commack, NY (US); Michael Faith, Coram, NY (US); Richard Linsley-Hood, Bonfield (GB); Charles Ubriaco, Northport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 85 days.

(21) Appl. No.: 11/365,633

(22) Filed: Feb. 28, 2006

(65) Prior Publication Data

US 2007/0202838 A1 Aug. 30, 2007

(51) Int. Cl.
*G08B 1/08* (2006.01)
(52) U.S. Cl. ............... 340/539.13; 340/539.2; 340/10.1; 455/344
(58) Field of Classification Search ............ 340/539.13, 340/539.2, 10.1, 455, 995.19; 455/456.3, 455/344, 403
See application file for complete search history.

(56) References Cited

U.S. PATENT DOCUMENTS 6,177,905 B1 * 1/2001 Welch .................... 342/357.13
6,181,253 B1 * 1/2001 Eschenbach et al. ... 340/825.37
6,233,448 B1    5/2001 Alperovich et al.
7,236,879 B2 * 6/2007 Tsunehara et al. .......... 701/207
7,259,668 B2 * 8/2007 Casey .................... 340/539.13
2003/0065805 A1 * 4/2003 Barnes ....................... 709/231
2003/0105971 A1 * 6/2003 Angelo et al. ............... 713/200
2005/0055578 A1 * 3/2005 Wright et al. ............... 713/201
2006/0262800 A1 * 11/2006 Martinez et al. ........ 370/395.52

FOREIGN PATENT DOCUMENTS

EP       1 251 362           10/2002
WO        02/23926            3/2002
WO       WO 0223926     *    3/2002
WO        02/076068           9/2002
WO       WO 02076068    *    9/2002

* cited by examiner

*Primary Examiner*—George A Bugg
*Assistant Examiner*—Hoi C Lau
(74) *Attorney, Agent, or Firm*—Fay Kaplun & Marcin, LLP

(57) ABSTRACT

Described is a system and method for locating a wireless device. The method comprising receiving a first wireless signal including first location data. The first location data corresponds to a first location of a wireless device as determined by a first wireless communication system. Receiving a second wireless signal including second location data. The second location data corresponding to a second location of the wireless device as determined by a second wireless communication system. Determining a third location of the device as a function of at least one of the first and second location data. Adjusting a setting of the wireless device as a function of the third location.

20 Claims, 3 Drawing Sheets

300

| Location ID | Location | Settings |
|---|---|---|
| 1 | Home | Enable home VoIP |
| 2 | Outside | Enable cellular |
| 3 | Office | Enable office VoIP |
| 4 | Garage | Enable Bluetooth |

Fig. 3

SYSTEM AND METHOD FOR LOCATING A WIRELESS DEVICE

FIELD OF INVENTION

The present invention relates to a system and method for locating a wireless device and adjusting functionality of the device based on the location.

BACKGROUND

A conventional locationing method for identifying a location of a wireless device relies upon a single technology. For example, the wireless device may rely on a global positioning system (GPS) to determine the location thereof. However, the GPS is limited when the device is located in an environment which obstructs or blocks a satellite signal between the device and a positioning satellite. For example, the satellite signal is relatively low-powered and may be easily obstructed by dense foliage, mountains, buildings and tunnels. Thus, the GPS may be unable to determination the location of the device in these environments, causing critical coverage gaps in coverage and connectivity.

SUMMARY OF THE INVENTION

The present invention relates to a system and method for locating a wireless device. The method comprising receiving a first wireless signal including first location data. The first location data corresponds to a first location of a wireless device as determined by a first wireless communication system. Receiving a second wireless signal including second location data. The second location data corresponding to a second location of the wireless device as determined by a second wireless communication system. Determining a third location of the device as a function of at least one of the first and second location data. Adjusting a setting of the wireless device as a function of the third location.

BRIEF DESCRIPTION OF THE DRAWINGS

FIG. 3 shows an exemplary embodiment of a location table according to the present invention.

DETAILED DESCRIPTION

Figure 1:
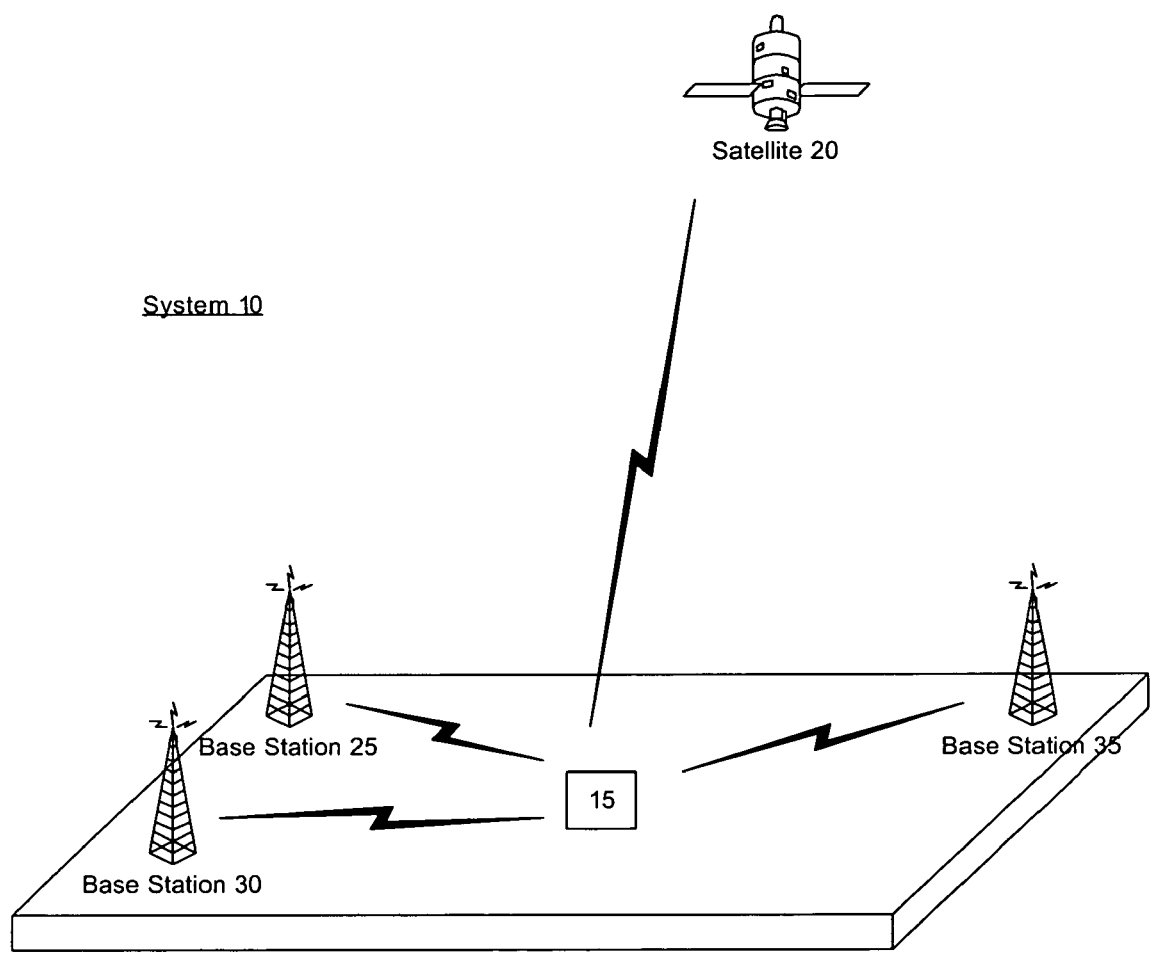
FIG. 1 shows an exemplary embodiment of a system according to the present invention.

The present invention may be further understood with reference to the following description and the appended drawings, wherein like elements are referred to with the same reference numerals. The exemplary embodiments of the present invention describe a system and method for locating a wireless device. A first location of the device may be determined using a first locationing system and a second location of the device may be determined using a second locationing system and the first location. Thus, the second location may provide the location of the device when the first locationing system is operationally limited and/or a more accurate determination of the location of the device. The exemplary embodiments further describe adjusting a functionality of the device based on the first and/or second locations.

FIG. 1 shows an exemplary embodiment of a system 10 according to the present invention. The system 10 includes a wireless computing device 15 which may be, for example, a cell phone, a PDA, a network interface card, an image/laser-based scanner, an RFID reader/tag, a tablet, a laptop, etc. When disconnected from a stationary power source (e.g., a line voltage), the device 15 may utilize a rechargeable battery for powering its components, e.g., processor, back light, screen, ringer, wireless communication capabilities, etc. According to the present invention, the device 15 may adjust functionality and/or settings of its components as a function of its location, as will be described further below.

The device 15 utilizes a first locationing system and a second locationing system to determine its location. In the exemplary embodiment, the first locationing system is a Global Positioning System (GPS) which utilizes an array of satellites (e.g., satellite 20) to provide first location data to the device 15. The device 15 utilizes the first location data to determine a first location thereof. As understood by those of skill in the art, the first location may be an estimate of an exact location of the device 15 due to inherent limitations of the GPS. That is, the first location corresponds to a predefined geographical area in which the device 15 is located.

In some environments, the device 15 may be unable to download the first location data from the satellite 20. For example, when the device 15 is within dense foliage or a tunnel, or adjacent a mountain or building, a signal from the satellite 20 may be obstructed or blocked, severing connectivity between the GPS and the device 15. Thus, the device 15 may utilize the second locationing system, e.g., a wireless wide area network (WWAN), to determine its location.

The WWAN comprises a wireless infrastructure including a plurality of base stations 25, 30, 35 distributed over a geographical area and providing wireless access to a communications network (e.g., the Internet backbone, a cellular network, etc.). The device 15 may conduct wireless communications on the WWAN using GPRS, CDMA or any other wireless communications technology. The device 15 may download second location data from any one of the base stations (e.g., the base station 25), and use the second location data to determine a second location thereof. The second location data may allow the device to determine the second location which may be the exact or substantially exact location of the device 15.

Those of skill in the art will understand that the device 15 may be configured to utilize the first or second location data as a default location data and only use the other location data to augment or further define the location of the device 15. For example, while the device 15 maintains connectivity with the satellite 20, it may only use the first location data to determine its location. However, when the connectivity with the satellite 20 is severed (temporarily or permanently), the device 15 may download the second location data from the base station 25, or any base station within a communicable range of the device 15. Further, the device 15 may use one or more further locationing systems for replacing or augmenting the first and/or second location data.

In the exemplary embodiment, the device 15 determines its location using the first and/or second location data. The location may then be utilized to adjust functionality of the device 15. For example, from the location, the device 15 may adjust its power settings, wireless connectivity, data transfer, etc. Additionally, the device 15 may alter a user interface to reflect the location and/or the adjusted functionality, as will be described below.

Figure 2:
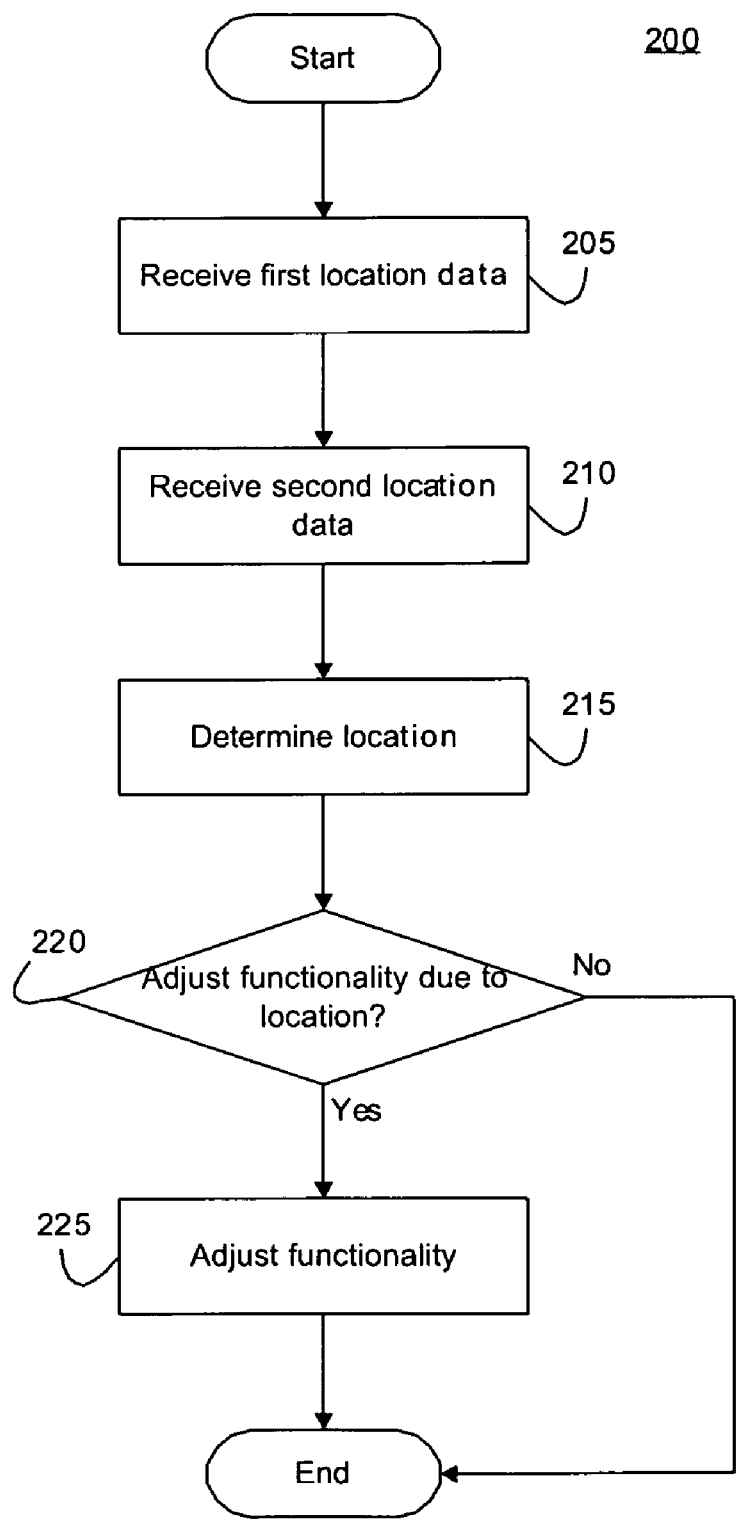
FIG. 2 shows an exemplary embodiment of a method according to the present invention.

FIG. 2 shows an exemplary embodiment of a method 200 according to the present invention. In step 205, the device 15 receives (downloads) the first location data from the satellite 20. Although the exemplary embodiment has been described with reference to using the GPS and then the WWAN, those of skill in the art will understand that these steps may be reversed and other locationing systems may be substituted or added to the present invention.

As described above, an environment (natural or manmade) in which the device 15 is located may obstruct/block the request from the device 15 for the first location data and/or the signal from the satellite 20 containing the first location data. In either instance, the device 15 may be disconnected from the GPS and unable to receive the first location data. When the device 15 does download the first location data, it may determine the first location as a function thereof.

In step 210, the device 15 receives the second location data from the base station 25. As similarly stated with reference to the first location data, the device 15 may be outside of a communicable range of the base station 25 or any device on the WWAN, preventing the device 15 from downloading the second location data. This may occur in, for example, remote geographical regions and/or high interference environments. Additionally, radio frequency signals transmitted by the device 15 and/or the base station 25 may be obstructed/blocked by the environment. When the device 15 does download the second location data, it may determine the second location as a function thereof.

In step 215, the device 15 determines its location (i.e., a third location) as a function of the first and/or second location data. In step 220, the device 15 determines whether to adjust its functionality as a function of the third location. When the device 15 has been relatively stationary such that the third location and a previously determined location do not differ, the device 15 may maintain its operation.

In step 225, the device 15 adjusts its functionality based on the third location determined in step 220. Based on the third location, the device 15 may adjust its power settings, lighting, sounds, user interface, etc. For example, the device 15 may store a table 300, shown in FIG. 3, which includes locations and corresponding settings based on the locations. In an exemplary embodiment, the device 15 may have previously determined, based on data from the GPS and/or the WWAN or any other wireless communications network, that it was located in a home (of the user of the device 15). The first and/or second location data may be indicative of a location identifier as shown in the table 300. For example, the location data may be indicative of the location identifier "1" corresponding to a "Home" location. When the device 15 is located in the "Home" location, it adjusts it settings accordingly. As shown in the table 300, the device 15 may switch from cellular communications to WLAN communication with a home network. In this manner, the device 15 may be used as a VoIP phone. In other embodiments, the device 15 may take into account a time of day when adjusting functionality. For example, when in the "Home" location and between the hours of 10 PM and 8 AM, the device 15 may switch from an audible ringer to a silent ring (LED/vibrate).

The table 300 shows further exemplary locations which may be identified by the device 15 using the first and/or second location data. For example, when the device 15 determines that it is in an "Outside" location (i.e., outside of the "Home" location or an "Office" location), it may enable cellular communications. When the device 15 determines that it is at a "Garage" location, it may enable Bluetooth® communications in anticipation that the device 15 may be used with a Bluetooth® headset in an automobile.

Those of skill in the art will understand that the table 300 may include a plurality of locations and corresponding settings. Additionally, the device 15 may be manually programmed or reprogrammed to enable predefined settings based on the third location. For example, the table 300 shows that the device 15 enables an office VoIP communication system when in the "Office" location. However, a user may further define the "Office" location by including a "My Office" location and a "Conference Room" location. When in the "My Office" location, the device 15 may be configured to enable the Bluetooth® communication system for use with, for example, a Bluetooth® headset. When in the "Conference Room" location, the device 15 may be configured for a silent ring (LED/vibrate). Thus, the device 15 may be configured to recognize any number of locations and adjust its functionality based thereon.

The present invention may enhance operation of the device 15 through prespecified functionality and power-saving. That is, a user may not have to reconfigure the device 15 based on his/her location. The device 15 may identify its location and adjust its functionality accordingly. When the device 15 goes into a sleep mode or powers-down as a function of its location, battery power is conserved extending the usefulness of the device 15.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A method, comprising:
   receiving a first wireless signal including first location data, the first location data corresponding to a first location of a wireless device as determined by a first wireless communication system;
   receiving a second wireless signal including second location data, the second location data corresponding to a second location of the wireless device as determined by a second wireless communication system;
   determining a third location of the device as a function of the first location data;
   verifying the third location as a function of the second location data; and
   comparing the third location to a list of preidentified locations, the list including the preidentified locations and corresponding settings of the device for each of the preidentified locations, wherein the preidentified locations and the corresponding settings are user-programmable via the wireless device; and
   when the third location matches one of the preidentified locations, adjusting the setting of the device to the corresponding settings of the one of the preidentified locations.

2. The method according to claim 1, wherein the setting includes at least one of (i) processing rate, (ii) back light brightness, (iii) ringer, (iv) wireless communication capability, (v) device power and (vi) data transfer rate.

3. The method according to claim 1, wherein the device is one of a cellular phone, a PDA, a network interface card, an image-based scanner, a laser-based scanner, an RFID tag, an RFID reader, a tablet and a laptop.

4. The method according to claim 1, wherein the first wireless communication system is a global positioning system.

5. The method according to claim 1, wherein the second wireless communication system is a wireless wide area network.

6. The method according to claim 1, further comprising:
   adjusting the setting as a function of a time at which the third location is determined.

7. A wireless device, comprising:
a communications arrangement receiving a first wireless signal including first location data, the first location data corresponding to a first location of the as determined by a first wireless communication system, the communications arrangement receiving a second wireless signal including second location data, the second location data corresponding to a second location of the device as determined by a second wireless communication system;
a memory storing a list of preidentified locations, the list including the preidentified locations and corresponding settings of the device for each of the preidentified locations, the list of preidentified locations and corresponding settings are user-programmable via the wireless device; and
a processor determining a third location of the device as a function the first location data, the processor adjusting a selling of the wireless device as a function of the third location and the list of preidentified locations;
wherein the processor verifies the third location as a function of the second location data.

8. The device according to claim 7, wherein the selling includes at least one of (i) processing rate, (ii) back light brightness, (iii) ringer, (iv) wireless communication capability, (v) device power and (vi) data transfer rate.

9. The device according to claim 7, wherein the device is one of a cellular phone, a PDA, a network interface card, an image-based scanner, a laser-based scanner, an RFID tag, an RFID reader, a tablet and a laptop.

10. The device according to claim 7, wherein the first wireless communication system is a global positioning system.

11. The device according to claim 7, wherein the second wireless communication system is a wireless wide area network.

12. The device according to claim 7, wherein when the third location matches one of the preidentified locations, the processor adjusts the setting of the device to the corresponding settings of the one of the preidentified locations.

13. The device according to claim 7, wherein the processor adjusts the setting as a function of a time at which the third location is determined.

14. An arrangement, comprising:
a communications means for receiving wireless signals including a first wireless signal and a second wireless signal, the first wireless signal including first location data, the first location data corresponding to a first location of the arrangement as determined by a first wireless communication system, the second wireless signal including second location data, the second location data corresponding to a second location of the arrangement as determined by a second wireless communication system;
a storage means for storing a list of preidentified locations, the list including the preidentified locations and corresponding settings of the device for each of the preidentified locations, the list of preidentified locations and corresponding settings are user-programmable via the wireless device; and
a processing means for determining a third location of the arrangement as a function of the first location data, the processing means adjusting a setting of the arrangement as a function of the third location and the list of preidentified locations;
wherein the processor verifies the third location as a function of the second location data.

15. The arrangement according to claim 14, wherein the setting includes at least one of (i) processing rate, (ii) back light brightness, (iii) ringer, (iv) wireless communication capability, (v) arrangement power and (vi) data transfer rate.

16. The arrangement according to claim 14, wherein the arrangement includes at least one of a cellular phone, a PDA, a network interface card, an image-based scanner, a laser-based scanner, an RFID tag, an RFID reader, a tablet and a laptop.

17. The arrangement according to claim 14, wherein the first wireless communication system is a global positioning system.

18. The arrangement according to claim 14, wherein the second wireless communication system is a wireless wide area network.

19. The arrangement according to claim 14, wherein when the third location matches one of the preidentified locations, the processing means adjusts the setting of the device to the corresponding settings of the one of the preidentified locations.

20. The arrangement according to claim 14, wherein the processing means adjusts the setting as a function of a time at which the third location is determined.

* * * * *

UNITED STATES PATENT AND TRADEMARK OFFICE
CERTIFICATE OF CORRECTION

PATENT NO. : 7,504,939 B2   Page 1 of 1
APPLICATION NO. : 11/365633
DATED : March 17, 2009
INVENTOR(S) : Zancola et al.

It is certified that error appears in the above-identified patent and that said Letters Patent is hereby corrected as shown below:

Title Page, Item (56), under "FOREIGN PATENT DOCUMENTS", in Column 2, Line 2, delete the repeated entry "WO    02/23926    3/2002".

Title Page, Item (56), under "FOREIGN PATENT DOCUMENTS", in Column 2, Line 4, delete the repeated entry "WO    02/076068    9/2002".

In Column 5, Line 4, in Claim 7, before "as", delete "of the".

In Column 5, Line 18, in Claim 7, after "function" insert -- of --.

In Column 5, Line 19, in Claim 7, delete "selling" and insert -- setting --, therefor.

In Column 5, Line 23, in Claim 8, delete "selling" and insert -- setting --, therefor.

Signed and Sealed this

Sixteenth Day of February, 2010

David J. Kappos
*Director of the United States Patent and Trademark Office*